(12) United States Patent
Takemori et al.

(10) Patent No.: US 7,728,543 B2
(45) Date of Patent: Jun. 1, 2010

(54) STEPPING MOTOR CONTROLLING DEVICE

(75) Inventors: Akio Takemori, Kiryu (JP); Yoshifumi Kuwano, Kiryu (JP); Hiroaki Taka, Kiryu (JP); Yoshitaka Iwaji, Hitachi (JP)

(73) Assignee: Japan Servo Co., Ltd., Tokyo (JP)

( * ) Notice: Subject to any disclaimer, the term of this patent is extended or adjusted under 35 U.S.C. 154(b) by 390 days.

(21) Appl. No.: 11/724,260

(22) Filed: Mar. 15, 2007

(65) Prior Publication Data

US 2007/0216335 A1      Sep. 20, 2007

(30) Foreign Application Priority Data

Mar. 17, 2006   (JP)   ............... 2006-074795
Mar. 22, 2006   (JP)   ............... 2006-079483

(51) Int. Cl.
*H02P 8/22* (2006.01)

(52) U.S. Cl. .............. 318/685; 318/671; 318/432; 318/434; 388/809; 388/816; 388/820

(58) Field of Classification Search ........... 318/685, 318/696, 671, 432, 434; 388/809, 816, 820
See application file for complete search history.

(56) References Cited

U.S. PATENT DOCUMENTS

| 4,691,153 | A  | * | 9/1987  | Nishimura ............ 318/696 |
|-----------|----|---|---------|-------------------------------|
| 5,598,081 | A  | * | 1/1997  | Okamura et al. ........... 318/801 |
| 6,285,156 | B1 | * | 9/2001  | Hartzsch ................. 318/696 |
| 6,483,270 | B1 | * | 11/2002 | Miyazaki et al. ........... 318/700 |
| 6,850,026 | B2 | * | 2/2005  | Takemori et al. .......... 318/685 |
| 6,909,256 | B2 | * | 6/2005  | Itabashi ................. 318/685 |
| 6,940,250 | B2 | * | 9/2005  | Nishimura et al. ......... 318/705 |
| 7,019,484 | B2 | * | 3/2006  | Takemori et al. .......... 318/685 |
| 2003/0178965 | A1 | * | 9/2003 | Kuwano et al. ........... 318/685 |
| 2005/0104551 | A1 | * | 5/2005 | Nishimura et al. ......... 318/719 |
| 2007/0040529 | A1 | * | 2/2007 | Takebayashi et al. ...... 318/685 |

FOREIGN PATENT DOCUMENTS

| JP | 2003-339193 A | 11/2003 |
| JP | 2004-180480 A |  6/2004 |
| JP | 2004-274922 A |  9/2004 |
| JP | 2004-289898 A | 10/2004 |

* cited by examiner

*Primary Examiner*—Rita Leykin
(74) *Attorney, Agent, or Firm*—Birch, Stewart, Kolasch & Birch, LLP (57) ABSTRACT

A stepping motor controlling device according to the present invention includes lead angle computing means which computes a lead angle according to the load torque current deviation of the stepping motor, adding means which adds an angle command to the lead angle to determine a winding exciting angle and voltage applying means which applies a voltage according to the winding exciting angle to the stepping motor.

14 Claims, 8 Drawing Sheets

OUTPUT OF CLOCK PULSE GENERATOR 96

OUTPUT OF OPERATION SETTING UNIT 84

OUTPUT Q OF FLIP FLOP 86

OUTPUT Q OF FLIP FLOP 88

OUTPUT Q OF FLIP FLOP 90

OUTPUT Q OF FLIP FLOP 92

OUTPUT Q OF FLIP FLOP 94

FIG. 8

STEPPING MOTOR CONTROLLING DEVICE

BACKGROUND OF THE INVENTION

1. Field of the Invention

The present invention relates to a stepping motor controlling device for controlling a stepping motor according to an angle command.

2. Description of the Prior Art

A conventional stepping motor controlling device controls the speed and position of the stepping motor in such a manner that a current command is determined from a maximum current command and angle command and a voltage is applied to the winding of the stepping motor according to a current deviation of the difference between the current command and winding current detection value.

Such a conventional stepping motor controlling device, however, cannot perform a control according to its load torque, so that the device cannot rotate the stepping motor at a high speed.

SUMMARY OF THE INVENTION

The present invention has for its purpose to provide a stepping motor controlling device capable of rotating a stepping motor at a high speed.

The present invention provides a stepping motor controlling device includes lead angle computing means which computes a lead angle according to the load torque current deviation of the stepping motor, adding means which adds the angle command to the lead angle to determine a winding exciting angle and voltage applying means which applies a voltage according to the winding exciting angle to the stepping motor.

In the stepping motor controlling device, a lead angle is set to a value according to a load torque current deviation to enable the stepping motor to generate a substantially maximum torque irrespective of speed, allowing the stepping motor to be rotated at a high speed.

DETAILED DESCRIPTION OF THE INVENTION

Figure 1:
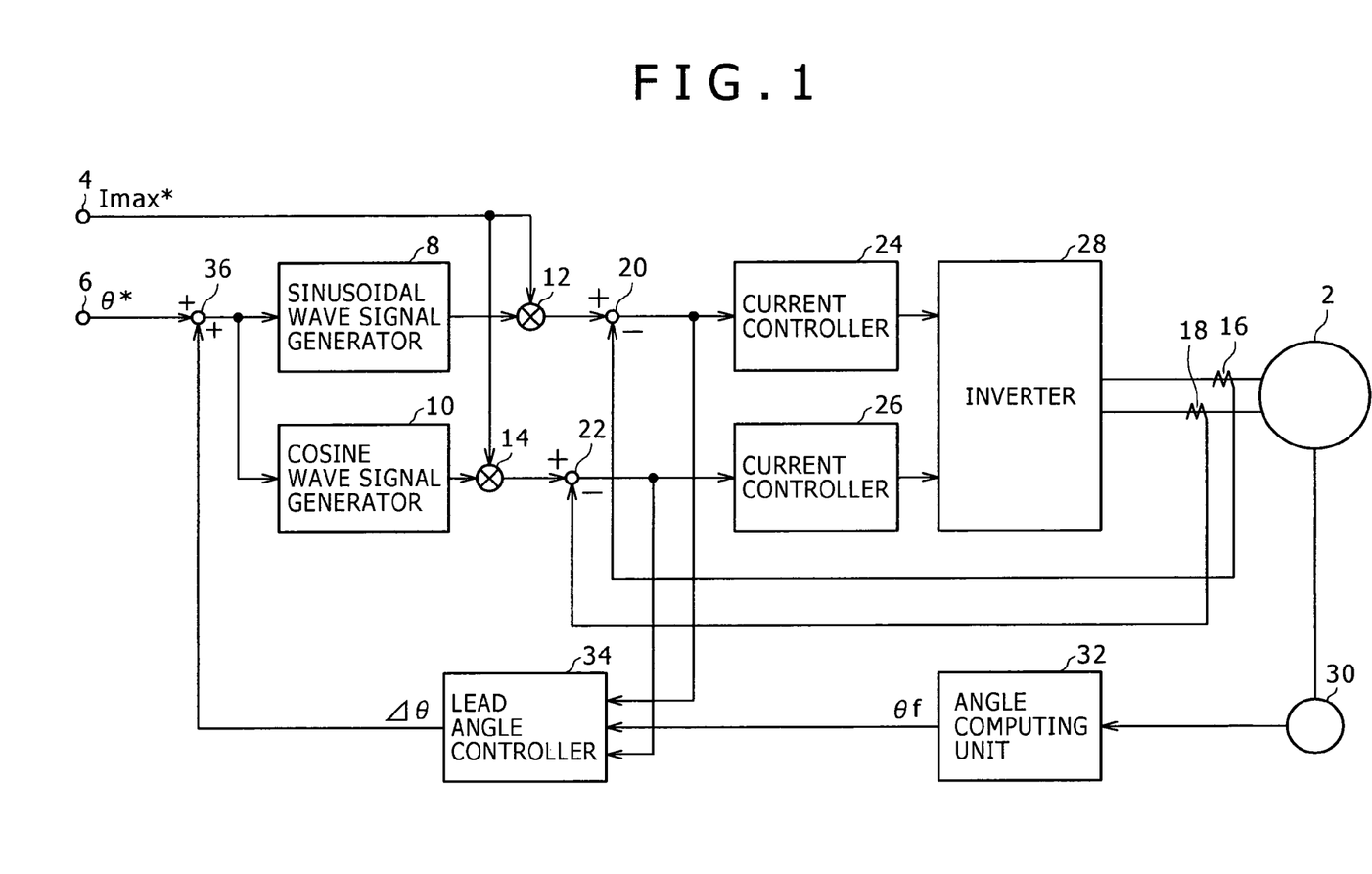
FIG. 1 shows a stepping motor controlling device according to the present invention.
Figure 2:
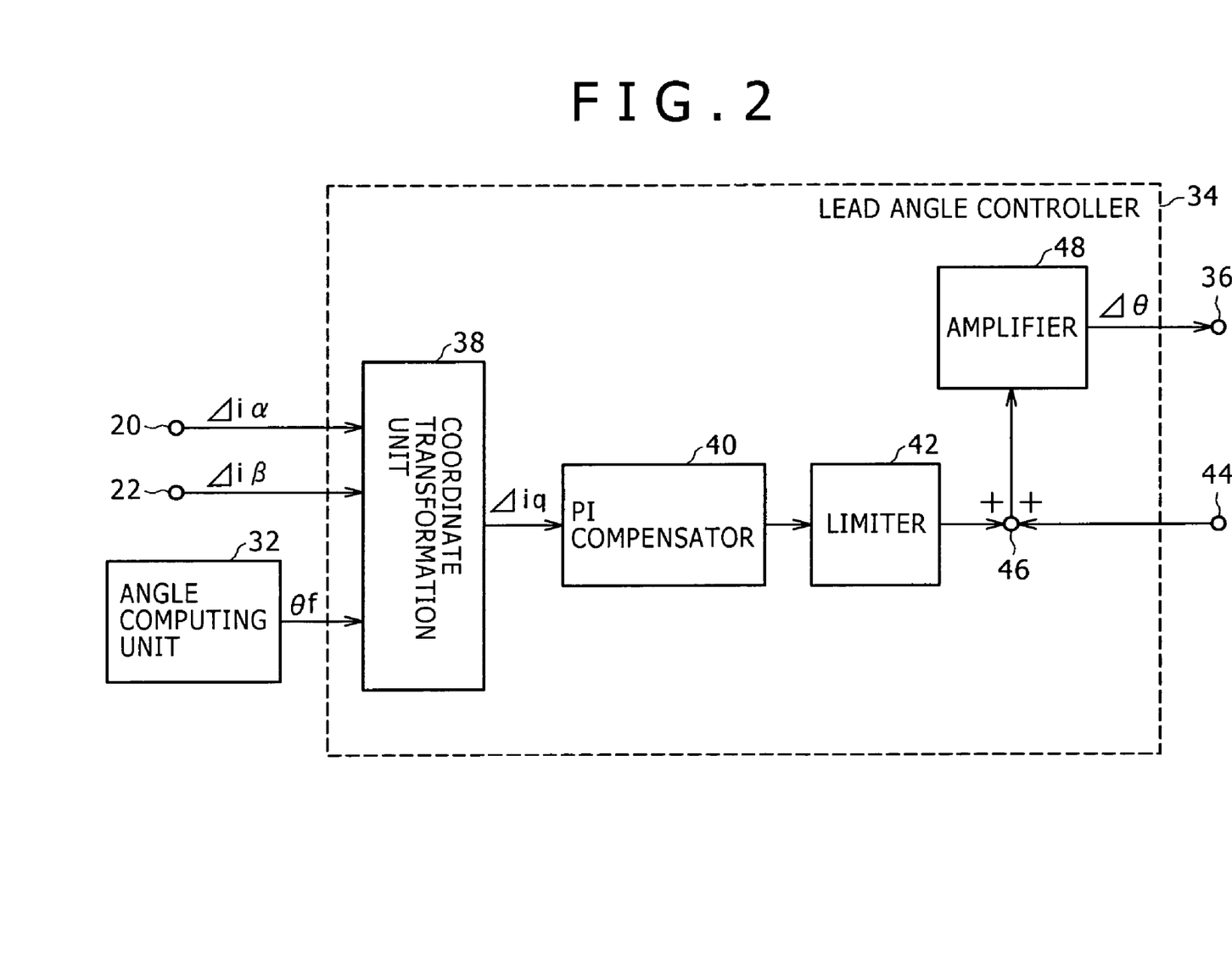
FIG. 2 shows a lead angle controller in the stepping motor controlling device illustrated in FIG. 1.

The stepping motor controlling device according to the present invention is described with reference to FIG. 1 and FIG. 2. A maximum current value command Imax* for a stepping motor 2 is input into a maximum current value command input-terminal 4. An angle command $\theta^*$ for the stepping motor 2 is input into an angle command input-terminal 6. A sinusoidal wave signal generator 8 receives the sum of the angle command $\theta^*$ and a lead angle $\Delta\theta$ (described later) and outputs a sinusoidal wave signal $\sin(\theta^*+\Delta\theta)$ using a data table. A cosine wave signal generator 10 receives the sum of the angle command $\theta^*$ and the lead angle $\Delta\theta$ and outputs a cosine wave signal $\cos(\theta^*+\Delta\theta)$ using a data table. A multiplier 12 multiplies the maximum current value command Imax* by the sinusoidal wave signal $\sin(\theta^*+\Delta\theta)$ and outputs an $\alpha$-phase current command value $i\alpha^*$. A multiplier 14 multiplies the maximum current value command Imax* by the cosine wave signal $\cos(\theta^*+\Delta\theta)$ and outputs a $\beta$-phase current command value $i\beta^*$. Current detectors 16 and 18 detect the winding current values of the $\alpha$-phase and the $\beta$-phase of the stepping motor 2 to output the winding current detection values $i\alpha f$ and $i\beta f$. A subtracter 20 subtracts the winding current detection value $i\alpha f$ from the current command value $i\alpha^*$ to output a current deviation $\Delta i\alpha$. A subtracter 22 subtracts the winding current detection value $i\beta f$ from the current command value $i\beta^*$ to output a current deviation $\Delta i\beta$. A current controller 24 receives the current deviation $\Delta i\alpha$ and outputs an $\alpha$-phase exciting current for the stepping motor 2. A current controller 26 receives the current deviation $\Delta i\beta$ and outputs a $\beta$-phase exciting current for the stepping motor 2. An inverter 28 applies the $\alpha$-phase and the $\beta$-phase voltage $V\alpha$ and $V\beta$ to the winding of the stepping motor 2 according to the $\alpha$-phase and the $\beta$-phase exciting current. An encoder 30 detects a position in the rotor of the stepping motor 2. An angle computing unit 32 receives the output of the encoder 30 and computes a detection angle $\theta f$. A lead angle controller 34 receives the current deviations $\Delta i\alpha$ and $\Delta i\beta$ and the detection angle $\theta f$ and outputs the lead angle $\Delta\theta$. An adder 36 adds the angle command $\theta^*$ to the lead angle $\Delta\theta$ to compute a winding exciting angle.

A coordinate transformation unit 38 computes a load torque current deviation (q-axis current deviation) $\Delta i q$ from the current deviations $\Delta i\alpha$ and $\Delta i\beta$ and the detection angle $\theta f$. A PI compensator 40 receives the load torque current deviation $\Delta i q$. When the output of the PI compensator 40 is less than 120 degrees, a limiter 42 directly outputs the output of the PI compensator 40. When the output of the PI compensator 40 is 120 degrees or more, the limiter 42 outputs an angle of 120 degrees. An adder 46 adds 90 degrees set to a set angle input-terminal 44 to the output of the limiter 42. An amplifier 48 amplifies the output of the adder 46 and outputs the lead angle $\Delta\theta$. Thus, the lead angle controller 34 is formed of the coordinate transformation unit 38, the limiter 42, the adder 46 and others.

Furthermore, the lead angle controller 34 forms lead angle computing means which computes a lead angle according to the load torque current deviation of the stepping motor. In addition, the adder 36 forms adding means which adds an angle command to a lead angle to determine a winding exciting angle. Still furthermore, the sinusoidal wave signal generator 8, the cosine wave signal generator 10, the multipliers 12 and 14, the subtracters 20 and 22, the current controllers 24 and 26, and the inverter 28 form voltage applying means which applies a voltage to the stepping motor according to a winding exciting angle. The coordinate transformation unit 38 forms coordinate transformation means which determines a load torque current deviation from the angle of the stepping motor (position in the magnetic pole of the rotor) and the current deviations by the voltage supplying means. The encoder 30 and the angle computing unit 32 form angle detecting means which detects the angle of the stepping motor. The limiter 42 forms limiting means which directly outputs a value according to a load torque current deviation when the value according to the load torque current deviation is less than 120 degrees, and outputs an angle of 120 degrees when the value according to the load torque current deviation is 120 degrees or more. In addition, the adder 46 forms adding means which adds the output of the limiting means to a set angle.

In the stepping motor controlling device, the coordinate transformation unit 38 computes the load torque current deviation $\Delta iq$ from the current deviations $\Delta i\alpha$ and $\Delta i\beta$ and the detection angle $\theta f$. The lead angle controller 34 determines the lead angle $\Delta\theta$ according to the load torque current deviation $\Delta iq$. The adder 36 adds the angle command $\theta^*$ to the lead angle $\Delta\theta$ to determine the winding exciting angle. The sinusoidal wave signal generator 8, the cosine wave signal generator 10, and the multipliers 12 and 14 determine the current command values $i\alpha^*$ and $i\beta^*$ according to the winding exciting angle. The subtracters 20 and 22, the current controllers 24 and 26, and the inverter 28 apply the $\alpha$-phase and the $\beta$-phase voltage $V\alpha$ and $V\beta$ to the winding of the stepping motor according to the current deviations $\Delta i\alpha$ and $\Delta i\beta$ which are the differences between the current command values $i\alpha^*$ and $i\beta^*$ and the winding current detection values $i\alpha f$ and $i\beta f$. Incidentally, a d-axis current is not controlled by a d-axis current deviation.

In the stepping motor controlling device, the lead angle $\Delta\theta$ is caused to accord with the load torque current deviation $\Delta iq$ to enable control according to the load torque of the stepping motor 2, allowing the stepping motor to generate a substantially maximum torque irrespective of its speed, thereby permitting the stepping motor to be rotated at a high speed.

Figure 3:
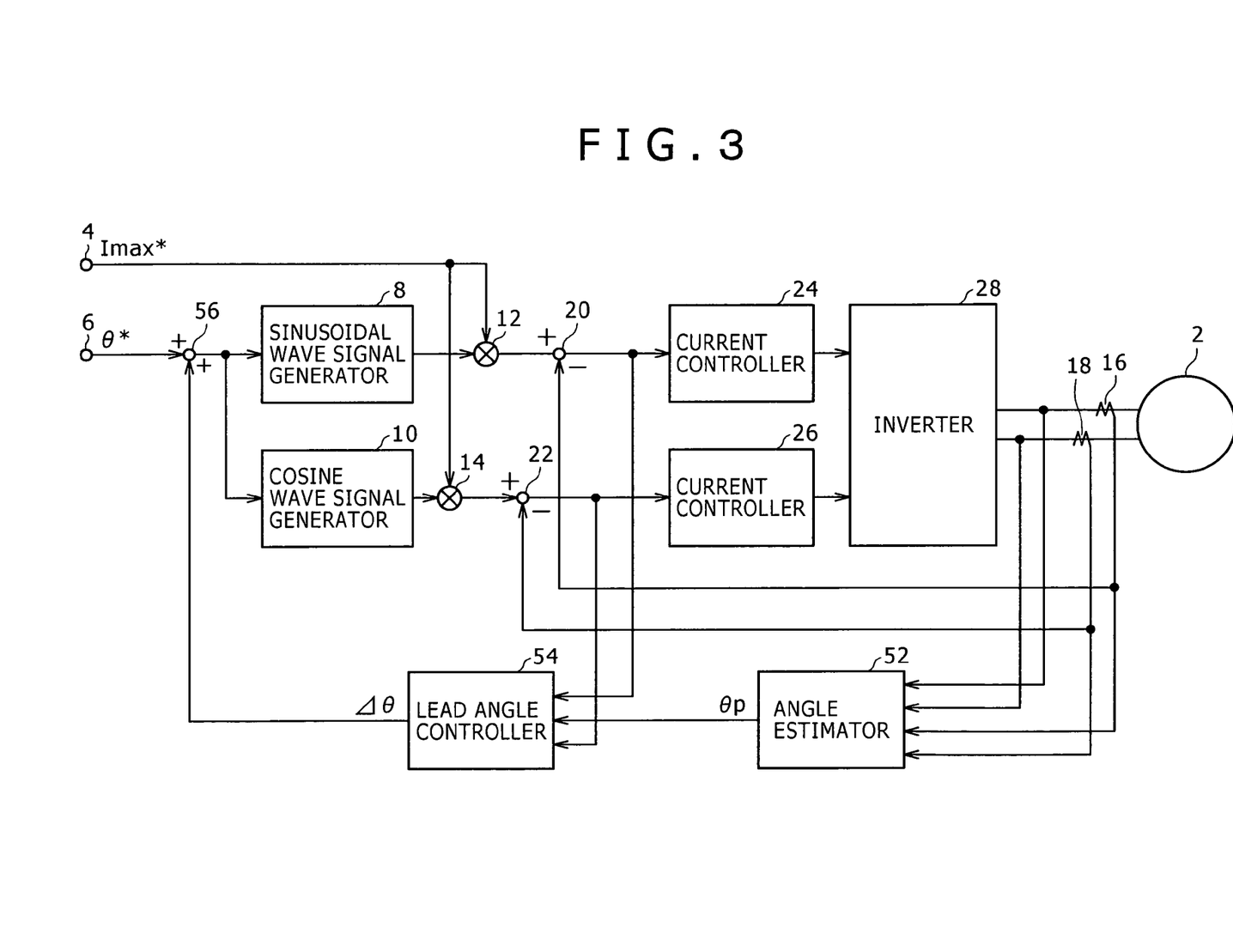
FIG. 3 shows another stepping motor controlling device according to the present invention.
Figure 4:
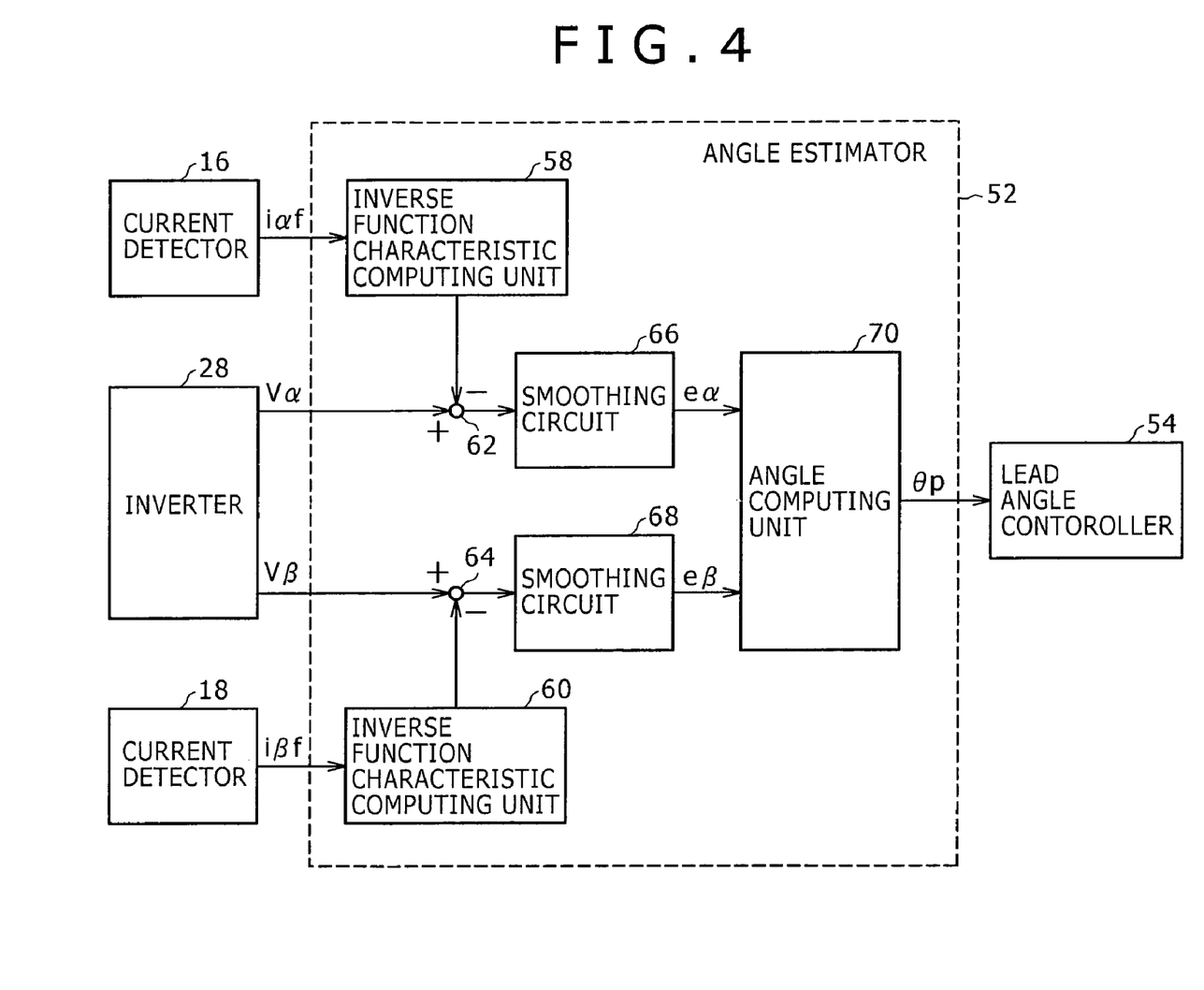
FIG. 4 shows an angle estimator in the stepping motor controlling device illustrated in FIG. 3.

Another stepping motor controlling device according to the present invention is described with reference to FIG. 3 and FIG. 4. An angle estimator 52 receives winding current detection values $i\alpha f$ and $i\beta f$, the $\alpha$-phase and the $\beta$-phase applying voltage $V\alpha$ and $V\beta$ and outputs an estimated angle $\theta p$. A lead angle controller 54 receives the current deviations $\Delta i\alpha$ and $\Delta i\beta$ and the estimated angle $\theta p$ and outputs the lead angle $\Delta\theta$. In other words, the lead angle controller 54 computes the lead angle $\Delta\theta$ as is the case with the lead angle controller 34 using the estimated angle $\theta p$ instead of the detection angle $\theta f$. An adder 56 adds the angle command $\theta^*$ to the lead angle $\Delta\theta$ to compute the winding exciting angle.

An inverse function characteristic computing unit 58 multiplies a coefficient $(R\alpha+sL\alpha)$ by the winding current detection value $i\alpha f$, where an $\alpha$-phase wire wound resistance of the stepping motor 2 is $R\alpha$, an $\alpha$-phase wire wound inductance is $L\alpha$ and a Laplacian operator is s. An inverse function characteristic computing unit 60 multiplies a coefficient $(R\beta+sL\beta)$ by the winding current detection value $i\beta f$, where a $\beta$-phase wire wound resistance of the stepping motor 2 is $R\beta$ and a $\beta$-phase wire wound inductance is $L\beta$. A subtracter 62 subtracts the output of the inverse function characteristic computing unit 58 from an $\alpha$-phase applying voltage $V\alpha$. A subtracter 64 subtracts the output of the inverse function characteristic computing unit 60 from an $\beta$-phase applying voltage $V\beta$. That is to say, when an $\alpha$-phase winding current value is taken to be $i\alpha$ $(=i\alpha f)$ and an $\alpha$-phase speed electromotive force is taken to be $e\alpha$, the output of the subtracter 62 is equal to a speed electromotive force $e\alpha$ by the relation of the following equation:

$$\frac{d}{dt}\begin{bmatrix} i_\alpha \\ e_\alpha \\ \dot{e}_\alpha \end{bmatrix} = \begin{bmatrix} -R_\alpha/L_\alpha & -1/L_\alpha & 0 \\ 0 & 0 & 1 \\ 0 & 0 & 0 \end{bmatrix}\begin{bmatrix} i_\alpha \\ e_\alpha \\ \dot{e}_\alpha \end{bmatrix} + \begin{bmatrix} 1/L_\alpha \\ 0 \\ 0 \end{bmatrix}V_\alpha \quad (1)$$

In addition, when a $\beta$-phase winding current value is taken to be $i\beta$ $(=i\beta f)$ and a $\beta$-phase speed electromotive force is taken to be $e\beta$, the output of the subtracter 64 is equal to a speed electromotive force $e\beta$ by the relation of the following equation:

$$\frac{d}{dt}\begin{bmatrix} i_\beta \\ e_\beta \\ \dot{e}_\beta \end{bmatrix} = \begin{bmatrix} -R_\beta/L_\beta & -1/L_\beta & 0 \\ 0 & 0 & 1 \\ 0 & 0 & 0 \end{bmatrix}\begin{bmatrix} i_\beta \\ e_\beta \\ \dot{e}_\beta \end{bmatrix} + \begin{bmatrix} 1/L_\beta \\ 0 \\ 0 \end{bmatrix}V_\beta \quad (2)$$

An angle computing unit 70 computes the estimated angle $\theta p$ using the following equation:

$$\theta p = \tan^{-1}(-e\alpha/e\beta) \quad (3)$$

The angle estimator 52 is formed of the inverse function characteristic computing units 58 and 60, smoothing circuits 66 and 68, the angle computing unit 70 and others. The angle estimator 52 forms angle estimating means which estimates the angle of the stepping motor.

In the stepping motor controlling device, the coordinate transformation unit 38 computes the load torque current deviation $\Delta iq$ from the current deviations $\Delta i\alpha$ and $\Delta\beta f$ and the estimated angle $\theta p$. In a similar way to the stepping motor controlling device illustrated in FIG. 1 and FIG. 2, the lead angle $\Delta\theta$ is caused to accord with the load torque current deviation $\Delta iq$ to enable the stepping motor 2 to be controlled according to the load torque thereof, allowing the stepping motor 2 to generate a substantially maximum torque irrespective of its speed, thereby permitting the stepping motor to be rotated at a high speed.

In the above embodiments, although the adder 46 is provided which adds an angle of 90 degrees set to the set angle input-terminal 44 to the output of the limiter 42, adding means may be provided which adds the set angle to a value according to the load torque current deviation. In the above embodiments, although the angle is set to 90 degrees, the angle may be set to 0 to 90 degrees. In the above embodiments, Although the limiter 42 is provided which directly outputs the output of the PI compensator 40 when the output of the PI compensator 40 is less than 120 degrees and outputs 120 degrees when the output of the PI compensator 40 is 120 degrees or more, limiting means may be provided which directly outputs a value according to the load torque current deviation when the value according to the load torque current deviation is less than a predetermined angle and outputs the predetermined angle when the value according to the load torque current deviation is the predetermined angle or more, in that case, the predetermined angle may be taken to be 100 to 140 degrees. Furthermore, although the PI compensator 40 is used in the above embodiments, a P compensator can be used instead of the PI compensator 40.

Another stepping motor controlling device according to the present invention is described with reference to FIG. 5 and FIG. 6. A first maximum current command Imax1* is input into a maximum current command input-terminal 72. A second maximum current command Imax2* $(=2\times \text{Imax1}^*)$ is input into a maximum current command input-terminal 74. A magnetic pole position compensator 76 receives the maximum current commands Imax1* and Imax2* and the detection angle $\theta f$ and outputs a compensation angle $\theta h$ and the maximum current value command Imax*. A subtracter 78 subtracts the compensation angle $\theta h$ from an angle command $\theta^*$. A multiplier 80 multiplies the maximum current value command Imax* by a sinusoidal wave signal $\sin(\theta^*-\theta h+\Delta\theta)$ and outputs a current command value $i\alpha^*$. A multiplier 82 multiplies the maximum current value command Imax* by a cosine wave signal $\cos(\theta^* - \theta h + \Delta\theta)$ and outputs a current command value $i\beta^*$.

An operation setting unit 84 outputs zero (0) at a first step when a power source is turned on and then outputs one (1) at a second step. A D flip-flop circuit 86 receives the output of the operation setting unit 84 at its terminal D. A D flip-flop circuit 88 receives the output of terminal Q of the D flip-flop circuit 86 at its terminal D. A D flip-flop circuit 90 receives the output of terminal Q of the D flip-flop circuit 88 at its terminal D. A D flip-flop circuit 92 receives the output of terminal Q of the D flip-flop circuit 90 at its terminal D. A D flip-flop circuit 94 receives the output of terminal Q of the D flip-flop circuit 92 at its terminal D. A clock pulse generator 96 generates a clock pulse and outputs clock pulses to the terminals CK of the D flip-flop circuits 86 to 94. The input terminal of a switcher 98 is connected to the angle computing unit 32. The input terminal of the switcher 98 is connected to the output terminal A thereof when the D flip-flop circuit 90 outputs zero (0) from its terminal Q, and the input terminal of the switcher 98 is connected to the output terminal B thereof when the D flip-flop circuit 90 outputs one (1) from its terminal Q. The input terminal A of a switcher 100 is connected to the maximum current command input-terminal 72 and the input terminal B of a switcher 100 is connected to the maximum current command input-terminal 74 and the input terminal A of the switcher 100 is connected to the output terminal thereof when the D flip-flop circuit 90 outputs zero (0) from its terminal Q and the input terminal B of the switcher 100 is connected to the output terminal thereof when the D flip-flop circuit 90 outputs one (1) from its terminal Q. When the D flip-flop circuit 88 outputs one (1) from its terminal Q, a latched circuit 102 latches the output of the output terminal A of the switcher 98 and outputs the latched value. When the D flip-flop circuit 92 outputs one (1) at its terminal Q, a latched circuit 104 latches the output of the output terminal B of the switcher 98 and outputs the latched value. A subtracter 106 subtracts the output of the latched circuit 104 from the output of the latched circuit 102 and outputs the difference. A compensation angle generator 108 stores a compensation angle data table based on the output of the subtracter 106 or the relationship between the angle difference δ and the compensation angle Δ or the relationship of following equation and outputs the compensation angle Δ according to the output of the subtracter 106:

$$\Delta = \tan^{-1}\{a \cdot \sin\delta / (1 - a \cdot \cos\delta)\} \quad (4)$$

where, a=Imax1*/Imax2*. A zero setting unit 110 outputs zero. The input terminal A of a switcher 112 is connected to the zero setting unit 110 and the input terminal B thereof is connected to the compensation angle generator 108. When the D flip-flop circuit 94 outputs zero (0) from its terminal Q, the input terminal A of a switcher 112 is connected to the output terminal thereof. When the D flip-flop circuit 94 outputs one (1) from its terminal Q, the input terminal B of a switcher 112 is connected to the output terminal thereof. The magnetic pole position compensator 76 outputs the output of the switcher 100 or the maximum current value command Imax* to the multipliers 80 and 82 and the output of the switcher 112 or the compensation angle θh to the subtracter 78. The magnetic pole position compensator 76 is formed of the D flip-flop circuits 86 to 94, switchers 98, 100 and 112, the compensation angle generator 108 and others, and output a first maximum current command at the time of stating the motor, subsequently output a second maximum current command and then detect a first and a second angle when the first and the second maximum current command are output and output the compensation value of angle command using data on difference between the first and the second angle.

In the stepping motor controlling device, turning on the power source causes the operation setting unit 84 to output zero (0) to cause the D flip-flop circuits 86 to 94 to output zeroes (0) at their terminals Q. For that reason, the input terminal of the switcher 98 is connected to the output terminal A thereof. In addition, the input terminal A of the switcher 100 is connected to the output terminal thereof, so that the magnetic pole position compensator 76 outputs the maximum current command Imax1* as the maximum current value command Imax* to the multipliers 80 and 82. Furthermore, the input terminal A of the switcher 112 is connected to the output terminal thereof, so that the magnetic pole position compensator 76 outputs zero (0) as the compensation angle θh to the subtracter 78. For this reason, the current command value $i\alpha^*$ becomes equal to $\text{Imax1}^* \cdot \sin(\theta^* + \Delta\theta)$. The current command value $i\beta^*$ becomes equal to $\text{Imax1}^* \cdot \cos(\theta^* + \Delta\theta)$. Thus, the voltages Vα and Vβ are applied to the winding of the stepping motor 2 according to the current command values $i\alpha^*$ and $i\beta^*$ and the winding current detection values iαf and iβf. In the next place, when the operation setting unit 84 outputs one (1) and the clock pulse generator 96 generates a clock pulse, as illustrated in FIG. 7, the D flip-flop circuit 86 outputs one (1) at its terminal Q. When the clock pulse generator 96 generates a following clock pulse, the D flip-flop circuit 88 outputs one (1) at its terminal Q, causing the latched circuit 102 to latch the detection angle θf at that point or a first angle θ1 illustrated in FIG. 8 (described later). Subsequently, when the clock pulse generator 96 generates a following clock pulse, the D flip-flop circuit 90 outputs one (1) at its terminal Q, connecting the input terminal of the switcher 98 to the output terminal B thereof. In addition, the input terminal B of the switcher 100 is connected to the output terminal thereof, causing the magnetic pole position compensator 76 to output the maximum current command Imax2* as the maximum current value command Imax* to the multipliers 80 and 82. For this reason, the current command value $i\alpha^*$ becomes equal to $\text{Imax2}^* \cdot \sin(\theta^* + \Delta\theta)$. The current command value $i\beta^*$ becomes equal to $\text{Imax2}^* \cdot \cos(\theta^* + \Delta\theta)$. The voltages Vα and Vβ are applied to the winding of the stepping motor 2 according to the current command values $i\alpha^*$ and $i\beta^*$ and the winding current detection values iαf and iβf. In the next place, when the clock pulse generator 96 generates a following clock pulse, the D flip-flop circuit 92 outputs one (1) at its terminal Q, causing the latched circuit 104 to latch the detection angle θf at that point or a second angle β2 illustrated in FIG. 8. Then, the subtracter 106 computes an angle difference δ (=θ1−θ2), and the compensation angle generator 108 outputs the compensation angle Δ corresponding to the angle difference δ. In the next place, when the clock pulse generator 96 generates a following clock pulse, the D flip-flop circuit 94 outputs one (1) at its terminal Q, connecting the input terminal B of the switcher 112 to the output terminal thereof to cause the magnetic pole position compensator 76 to output the compensation angle Δ as the compensation angle θh to the subtracter 78. For this reason, the current command value $i\alpha^*$ becomes equal to $\text{Imax2}^* \cdot \sin(\theta^* - \Delta + \Delta\theta)$. The current command value $i\beta^*$ becomes equal to $\text{Imax2}^* \cdot \cos(\theta^* - \Delta + \Delta\theta)$. The voltages Vα and Vβ are applied to the winding of the stepping motor 2 according to the current command values $i\alpha^*$ and $i\beta^*$ and the winding current detection values iαf and iβf.

Figure 8:
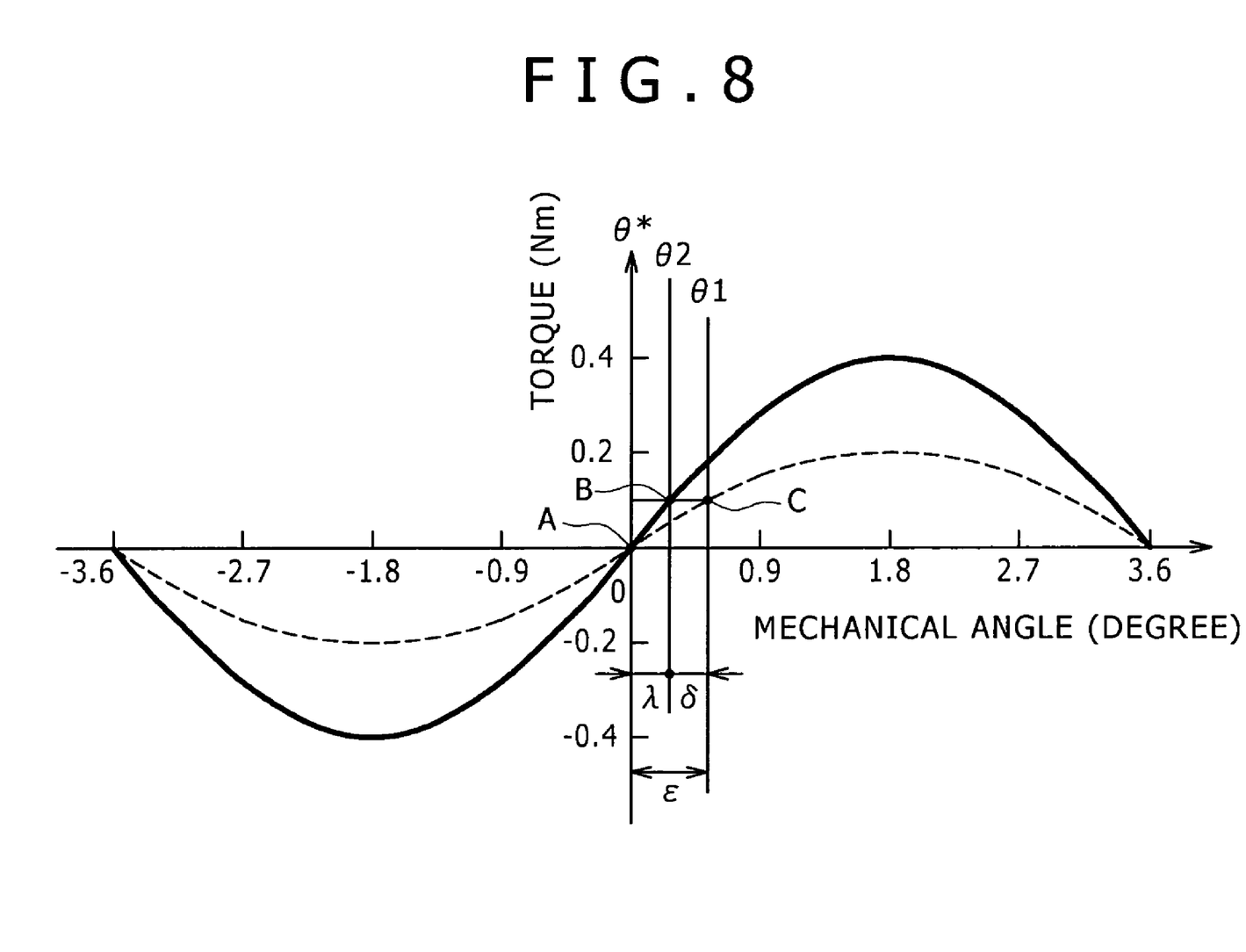

FIG. 8 shows an example of the angle versus torque characteristic (θ vs T characteristic) of a stepping motor with 50 pole-pair and a basic step angle of 1.8 degrees. The solid line in the figure shows the θ vs T characteristic obtained when rated current is applied or when the maximum current value command Imax* is equal to the maximum current command Imax2*. The broken line in the figure shows the θ vs T characteristic obtained when 50% of the rated current is applied or when the maximum current value command Imax* is equal to the maximum current command Imax1*. It is a matter of common knowledge that the relationship of the rotor angle to the torque of the stepping motor can be approximated by the following equation when a generated torque is taken to be T, a torque constant to be kt and a magnetic pole position to be θ, and the generated torque T is proportional to motor current:

$$T = kt \cdot I\max^* \cdot \sin\theta. \quad (5)$$

A point A in the figure is referred to as a stable point. If the point A is taken to be an initial magnetic pole position assuming that a rotor stops at the point A, the initial magnetic pole position is erroneously detected by the influence of a load torque. For example, when a load torque of 0.1 Nm acts on the rotor with the rotor of the stepping motor stopped at the time of applying a rated current, a rotor stop position or the initial magnetic pole position is a point B, being shifted by a position deviation λ=θ2−θ* from the point A. An error of the initial magnetic pole position increases a phase error between magnetic flux and current to cause a problem in that a generated torque is decreased.

When a load torque of 0.1 Nm acts on the rotor with the rotor of the stepping motor stopped at the time of applying the rated current by 50%, the rotor stops at a point C. The burden of the load and the change of the exciting current cause the point C to be significantly farther from the point A, which means that the point C is shifted by a position deviation ε=θ1−θ* with respect to the angle command θ* or the point A. First, the stepping motor 2 is excited by 50% of the rated current to detect the angle θ1 and secondly, the stepping motor 2 is excited by the rated current to detect the angle θ2. Substituting the angle difference δ between the angles θ1 and θ2 (δ=θ1−θ2=ε−λ) into the above equation (4) enables deriving the compensation angle Δ to compensate the error of the initial magnetic pole position.

Figure 5:
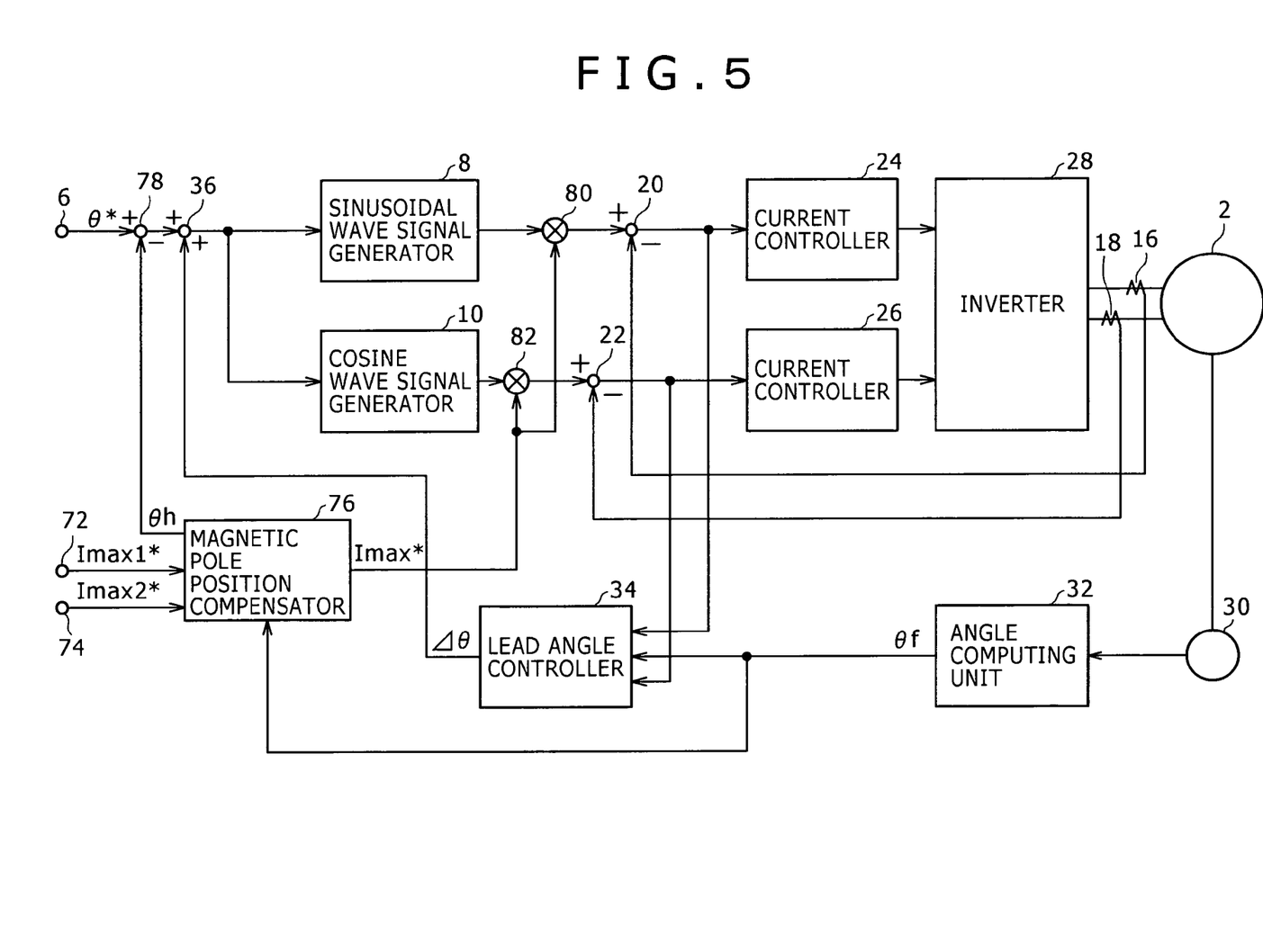
FIG. 5 shows another stepping motor controlling device according to the present invention.
Figure 6:
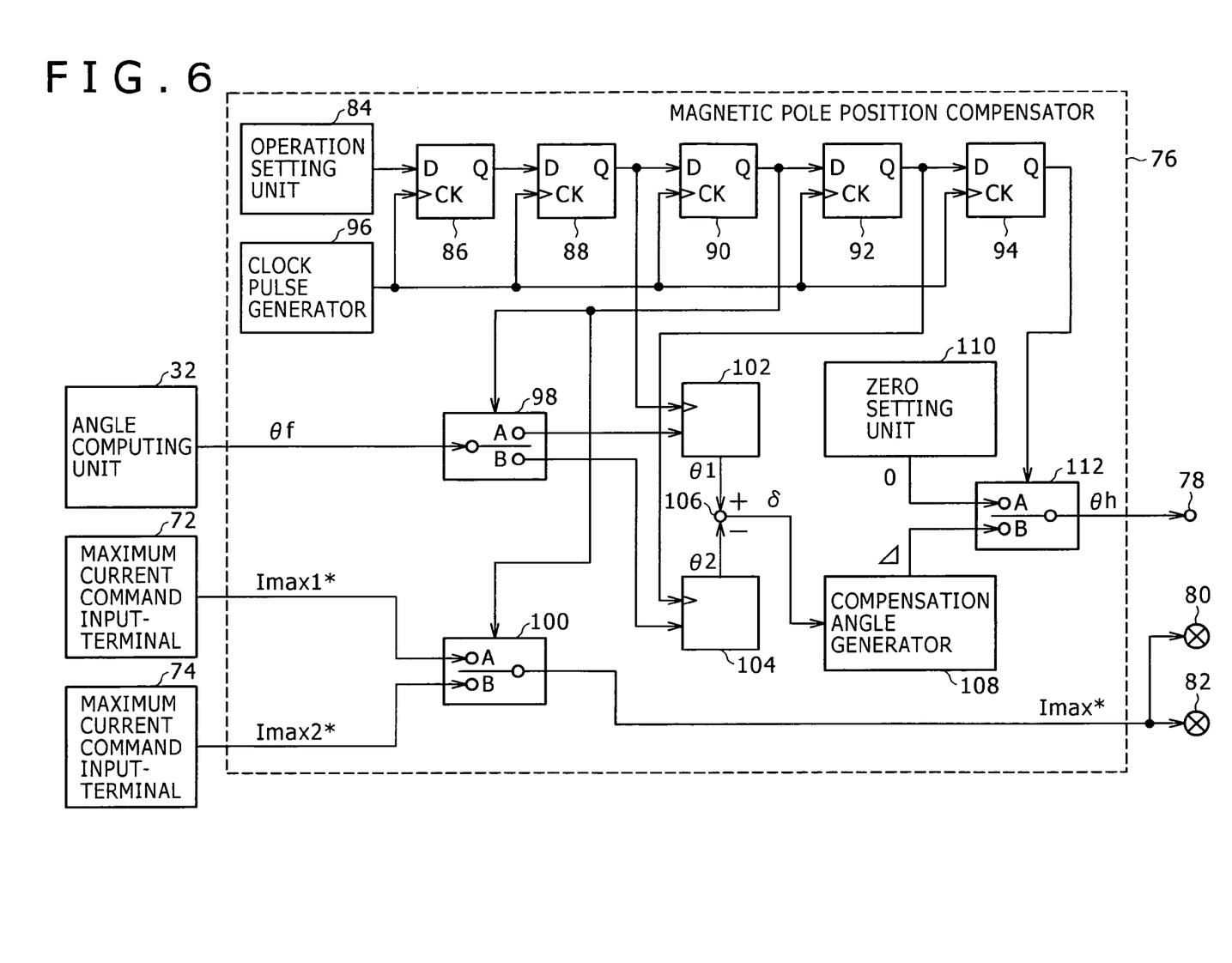
FIG. 6 shows a magnetic pole position compensator in the stepping motor controlling device illustrated in FIG. 5.
Figure 7:
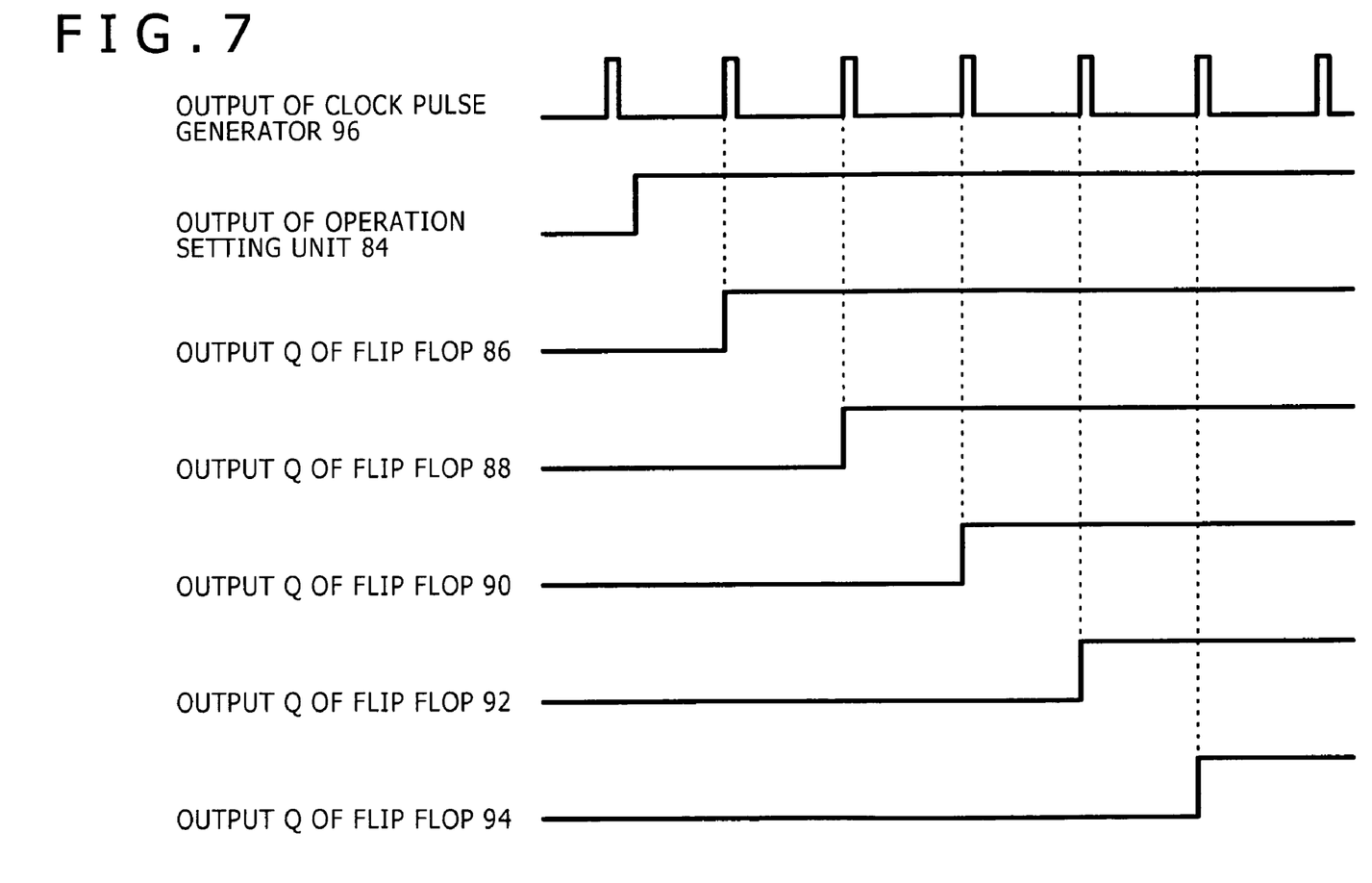
FIG. 7 and FIG. 8 are explanatory drawings for the stepping motor controlling device illustrated in FIG. 5 and FIG. 6.

In the stepping motor controlling device illustrated in FIG. 5 and FIG. 6, turning on the power source causes the magnetic pole position compensator 76 to output the maximum current command Imax1* as the maximum current value command Imax* to the multipliers 80 and 82, causing the stepping motor 2 to be first excited by 50% of the rated current. Then, the latched circuit 102 latches the angle θ1. Subsequently, the magnetic pole position compensator 76 outputs the maximum current command Imax2* as the maximum current value command Imax* to the multipliers 80 and 82, causing the stepping motor 2 to be excited by the rated current. Then, the latched circuit 104 latches the angle β2. Next, the subtracter 106 computes the angle difference δ and the compensation angle generator 108 outputs the compensation angle Δ corresponding to the angle difference δ. The magnetic pole position compensator 76 outputs the compensation angle Δ as the compensation angle θh to the subtracter 78 to cause the winding exciting angle to be equal to θ*−Δ+Δθ. For this reason, even when a load torque acts on the rotor at the time of starting, the error of the initial magnetic pole position can be compensated, decreasing a phase error between magnetic flux and current to prevent a generated torque from decreasing. For example, the error of the initial magnetic pole position can be compensated even in applications for a driving system in a vertical axis direction in which a load torque is generated by gravity when the motor stops.

The use of the compensation angle generator 108 which stores the compensation angle data-table allows the compensation angle Δ to be speedily calculated.

Although the maximum current commands Imax1* and Imax2* are taken to be 50% of the rated current and the rated current respectively, they do not always need to be done so. While the compensation angle Δ is determined by the compensation angle generator 108, the compensation angle Δ may be calculated by the equation (4), provided that there is a sufficient time margin in processing.

In the embodiments according to the present invention, although the encoder 30 is used in the angle detector, it may be replaced with a detector, for example, with a resolver of which performance is equivalent to that of the angle detector. The angle detector does not need to be a sensor connected directly to the motor axis. The two-phase stepping motor is described above, however, the present invention can be applied to multi-phase stepping motor.

The terms and expressions which have been employed are used as terms of description and not of limitation, and there is no intention in the use of such terms and expressions of excluding any equivalents of the features shown and described, or portions thereof, but it is recognized that various modifications are possible within the scope of the invention claimed.

What is claimed is:

1. A stepping motor controlling device for controlling a stepping motor according to an angle command comprising:
   lead angle computing means which computes a lead angle according to the load torque current deviation of said stepping motor;
   adding means which adds said angle command to said lead angle to determine a winding exciting angle; and
   voltage applying means which applies a voltage according to said winding exciting angle to said stepping motor,
   wherein said lead angle computing means comprises:
   limiting means which directly outputs a value according to said load torque current deviation when said value according to said load torque current deviation is less than a predetermined angle and outputs the predetermined angle when said value according to said load torque current deviation is said predetermined angle or larger; and
   adding means which adds a set angle to the output of said limiting means.

2. The stepping motor controlling device according to claim 1, wherein said predetermined angle is 100 to 140 degrees.

3. The stepping motor controlling device according to claim 1, wherein said set angle is 0 to 90 degrees.

4. The stepping motor controlling device according to claim 1, wherein said lead angle computing means comprises coordinate transformation means which determines said load torque current deviation from the angle of said stepping motor and the current deviation of said voltage supplying means.

5. The stepping motor controlling device according to claim 4, wherein angle detecting means which detects said angle of said stepping motor is provided to use the angle detected by said angle detecting means as said angle of said stepping motor.

6. The stepping motor controlling device according to claim 4, wherein angle estimating means which estimates said angle of said stepping motor to use the angle estimated by said angle estimating means as said angle of said stepping motor.

7. A stepping motor controlling device for controlling a stepping motor according to an angle command comprising:
 lead angle computing means which computes a lead angle according to the load torque current deviation of said stepping motor;
 adding means which adds said angle command to said lead angle to determine a winding exciting angle;
 voltage applying means which applies a voltage according to said winding exciting angle to said stepping motor; and
 a magnetic pole position compensator which outputs a first maximum current command when said stepping motor starts, outputs a second maximum current command, detects a first angle when said first maximum current command is output and a second angle when said second maximum current command is output and outputs the compensation value of said angle command using data on difference between said first angle and said second angle.

8. A stepping motor controlling device for controlling a stepping motor according to an angle command comprising:
 a lead angle computing device configured to compute a lead angle according to the load torque current deviation of said stepping motor;
 an adding device configured to add said angle command to said lead angle to determine a winding exciting angle; and
 a voltage applying device configured to apply a voltage according to said winding exciting angle to said stepping motor,
 wherein said lead angle computing device comprises:
 a limiting device configured to directly output a value according to said load torque current deviation when said value according to said load torque current deviation is less than a predetermined angle and output the predetermined angle when said value according to said load torque current deviation is said predetermined angle or larger; and
 an adding device configured to add a set angle to the output of said limiting device.

9. The stepping motor controlling device according to claim 8, wherein said lead angle computing device comprises a coordinate transformation device which determines said load torque current deviation from an angle of said stepping motor and a current deviation of said voltage supplying device.

10. The stepping motor controlling device according to claim 9, wherein an angle detecting device which detects said angle of said stepping motor is provided to use the angle detected by said angle detecting device as said angle of said stepping motor.

11. The stepping motor controlling device according to claim 9, wherein an angle estimating device which estimates said angle of said stepping motor is provided to use the angle estimated by said angle estimating device as said angle of said stepping motor.

12. The stepping motor controlling device according to claim 8, wherein said predetermined angle is 100 to 140 degrees.

13. The stepping motor controlling device according to claim 8, wherein said set angle is 0 to 90 degrees.

14. A stepping motor controlling device for controlling a stepping motor according to an angle command comprising:
 a lead angle computing device configured to compute a lead angle according to the load torque current deviation of said stepping motor;
 an adding device configured to add said angle command to said lead angle to determine a winding exciting angle;
 a voltage applying device configured to apply a voltage according to said winding exciting angle to said stepping motor; and
 a magnetic pole position compensator which outputs a first maximum current command when said stepping motor starts, outputs a second maximum current command, detects a first angle when said first maximum current command is output and a second angle when said second maximum current command is output and outputs the compensation value of said angle command using data on difference between said first angle and said second angle.

* * * * *